(12) United States Patent
Svensson et al.

(10) Patent No.: US 6,954,489 B2
(45) Date of Patent: Oct. 11, 2005

(54) DETERMINING CORRELATIONS OF RECEIVED SEQUENCES TO MULTIPLE KNOWN SEQUENCES IN A COMMUNICATIONS SYSTEM

(75) Inventors: Lars Svensson, Göteborg (SE); Bengt Lindoff, Bjärred (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 553 days.

(21) Appl. No.: 09/753,913

(22) Filed: Jan. 2, 2001

(65) Prior Publication Data

US 2002/0118730 A1 Aug. 29, 2002

(51) Int. Cl.$^7$ .......................... H04B 15/00; H04K 1/00; H04L 27/30
(52) U.S. Cl. ...................................... 375/150; 375/343
(58) Field of Search ................................ 375/150, 142, 375/343

(56) References Cited

U.S. PATENT DOCUMENTS

| | | | |
|---|---|---|---|
| 4,761,796 A | | 8/1988 | Dunn et al. .................... 375/1 |
| 5,031,193 A | * | 7/1991 | Atkinson et al. ........... 375/231 |
| 5,093,848 A | * | 3/1992 | Raith ......................... 375/344 |
| 5,136,616 A | * | 8/1992 | Dent ........................... 375/341 |
| 5,309,503 A | * | 5/1994 | Bruckert et al. ........... 455/452.2 |
| 5,479,446 A | | 12/1995 | Mourot ....................... 375/243 |
| 5,506,861 A | * | 4/1996 | Bottomley .................. 370/441 |
| 5,577,024 A | | 11/1996 | Malkamaki et al. .......... 370/18 |
| 5,581,580 A | * | 12/1996 | Lindbom et al. ........... 375/340 |
| 5,640,432 A | * | 6/1997 | Wales ......................... 375/346 |
| 5,657,348 A | | 8/1997 | Ericsson et al. ............ 375/227 |
| 5,917,829 A | * | 6/1999 | Hertz et al. ................. 370/479 |
| 5,960,048 A | * | 9/1999 | Haartsen .................... 375/366 |
| 5,995,499 A | | 11/1999 | Hottinen et al. ........... 370/337 |
| 6,005,899 A | * | 12/1999 | Khayrallah ................. 375/343 |
| 6,122,269 A | * | 9/2000 | Wales ......................... 370/338 |
| 6,298,102 B1 | * | 10/2001 | Rainish et al. ............. 375/341 |

FOREIGN PATENT DOCUMENTS

| | | |
|---|---|---|
| EP | 000667683 A2 * | 8/1995 |
| EP | 0 859 485 | 8/1998 |
| WO | WO 98/38750 | 9/1998 |

OTHER PUBLICATIONS

EPO Standard Search Report for RS 106276 US mailed Dec 5, 2001.
"Digital Cellular Telecommunications System, (Phase 2+); Multiplexing and Multiple Access on the Radio Path",(GSM 05.02 Version 6.3.0 Release 1997), Draft EN 300 908 V6.3.0 (Nov. 1998) European Standard (Telecommunications series).
C. Tidestav and E. Lindskog, "Bootstrap Equalization", *IEEE*, ISSN 0–7803–5106–1/98, pp. 1221–1225, Jan. 1998.
D. Astély, A. Jakobsson and A. Swindlehurst, "Burst Synchronization on Unknown Frequency Selective Channels with Co–Channel Interference Using an Antenna Array", *IEEE*, ISSN 0–7803–5565–2/99, pp. 2363–2367, Feb. 1999.

* cited by examiner

*Primary Examiner*—Jean B. Corrielus
(74) *Attorney, Agent, or Firm*—Jenkens & Gilchrist, P.C.

(57) ABSTRACT

A method, system, and apparatus enables interfering signals in a communications system to be efficiently identified using correlation calculations. Once identified, the interfering signals may be rejected and removed from further processing in a receiver. The number of mathematical operations required to determine correlates of multiple training sequences to received sequences (e.g., at multiple offsets) may be reduced by up to eighty percent (80%) in a Global System for Mobile Communications (GSM) implementation. In accordance with certain embodiments, a correlation equation is manipulated, for example, to eliminate certain products by ensuring that they equate to zero, to eliminate redundant calculations by recognizing repeated subsequences, to eliminate common subexpressions, to determine a negative of a correlation result, etc. The manipulated correlation equation is then utilized within a receiver.

33 Claims, 7 Drawing Sheets

Training Sequences

| index i | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| Seq. # | | | | | | | | | | | | | | | | | | | | | | | | | | |
| 1 | 1 | 1 | 1 | -1 | 1 | 1 | 1 | 1 | -1 | -1 | -1 | 1 | -1 | -1 | 1 | -1 | 1 | 1 | 1 | -1 | 1 | 1 | 1 | 1 | -1 | -1 |
| 2 | 1 | -1 | 1 | -1 | -1 | 1 | 1 | 1 | 1 | 1 | -1 | 1 | 1 | -1 | -1 | -1 | 1 | -1 | 1 | -1 | -1 | 1 | 1 | 1 | 1 | 1 |
| 3 | -1 | 1 | -1 | -1 | 1 | 1 | 1 | -1 | 1 | -1 | 1 | 1 | -1 | -1 | -1 | -1 | -1 | 1 | -1 | -1 | 1 | 1 | 1 | -1 | 1 | -1 |
| 4 | -1 | -1 | -1 | 1 | 1 | -1 | 1 | -1 | 1 | 1 | 1 | -1 | -1 | 1 | -1 | -1 | -1 | -1 | 1 | 1 | -1 | 1 | -1 | 1 | 1 | 1 |
| 5 | -1 | 1 | -1 | -1 | 1 | 1 | 1 | 1 | -1 | 1 | 1 | -1 | 1 | -1 | -1 | 1 | -1 | -1 | 1 | 1 | 1 | 1 | -1 |
| 6 | -1 | 1 | -1 | -1 | -1 | -1 | 1 | 1 | 1 | -1 | 1 | 1 | 1 | -1 | 1 | -1 | 1 | -1 | -1 | -1 | -1 | 1 | 1 | 1 | -1 |
| 7 | -1 | -1 | 1 | -1 | 1 | 1 | 1 | -1 | 1 | 1 | 1 | -1 | 1 | 1 | 1 | -1 | -1 | -1 | 1 | -1 | 1 | 1 | -1 | 1 | 1 | 1 |
| 8 | -1 | -1 | 1 | -1 | -1 | 1 | -1 | 1 | 1 | 1 | 1 | -1 | -1 | -1 | -1 | 1 | -1 | -1 | -1 | 1 | -1 | -1 | 1 | 1 | -1 | 1 | 1 | 1 |

MODIFY THE CORRELATE EQUATION(S) TO INCLUDE A SUM THAT IS DEPENDENT ON THE RECEIVED SEQUENCE(S) BUT INDEPENDENT OF THE TRAINING SEQUENCE

MODIFY THE CORRELATE EQUATION(S) SO THAT ALL PRODUCTS CORRESPONDING TO AT LEAST ONE VALUE OF THE TRAINING SEQUENCE(S) BECOME ZERO

MODIFY THE CORRELATE EQUATION(S) SO THAT THE NUMBER OF PRODUCTS TO BE CALCULATED IS LESS THAN THE NUMBER OF VALUES IN A TRAINING SEQUENCE

MODIFY THE CORRELATE EQUATION(S) BY ELIMINATING COMMON SUBEXPRESSIONS

| 505 | 510 | 515 |
|---|---|---|
| $a_{16}$ | 00000000000000010000000000 | 00000000 |
| $a_{15}$ | 00000000000000100000000000 | 10000111 |
| $a_{14}$ | 00000000000001000000000000 | 00011010 |
| $a_{13}$ | 00000000000010000000000000 | 01000110 |
| $a_{12}$ | 00000000000100000000000000 | 11101110 |
| $a_{11}$ | 00000000001000000000000000 | 00111100 |
| $b_{10}$ | 00000000010000000000000001 | 01010011 |
| $b_{9}$  | 00000000100000000000000010 | 01111111 |
| $b_{8}$  | 00000001000000000000000100 | 11001111 |
| $b_{7}$  | 00000010000000000000001000 | 11111100 |
| $b_{6}$  | 00000100000000000000010000 | 11101011 |
| $b_{5}$  | 00001000000000000000100000 | 10110010 |
| $b_{4}$  | 00010000000000000001000000 | 00010000 |
| $b_{3}$  | 00100000000000000010000000 | 11000011 |
| $b_{2}$  | 01000000000000000100000000 | 10101100 |
| $b_{1}$  | 10000000000000001000000000 | 11000000 |

505a = $a_{16}$ through $a_{11}$
505b = $b_{10}$ through $b_{1}$

FIG. 5

DETERMINING CORRELATIONS OF RECEIVED SEQUENCES TO MULTIPLE KNOWN SEQUENCES IN A COMMUNICATIONS SYSTEM

BACKGROUND OF THE INVENTION

1. Technical Field of the Invention

The present invention relates in general to the field of communications, and in particular, by way of example but not limitation, to determining correlations between received sequences and multiple training sequences in an efficient manner that minimizes the number of required mathematical operations.

2. Description of Related Art

Many people and organizations increasingly rely on wireless communication for safety, convenience, and productivity, as well as simple conversational pleasure. One example of wireless communication is cellular communication. Cellular phone use has proliferated as the size of mobile terminals (MTs) and the cost for service subscriptions as well as air time have decreased. As cellular phone use has proliferated and the allocated radio frequency (RF) spectrum has become correspondingly more crowded, it has become ever more important to efficiently utilize the available RF spectrum.

Cellular communication systems, such as the Global System for Mobile Communications (GSM), therefore need to efficiently reuse the RF spectrum in order to attempt to maximize the capacity of the system. Consequently, such systems are often Carrier-to-Interference (C/I) limited; in other words, co-channel interferers are often the factor limiting capacity in a system. In conventional systems, co-channel interferers are addressed in the demodulation process as unknown white noise.

However, it has been observed that better receiver performance (e.g., a lower bit error rate (BER)) can be obtained by using knowledge of the interfering signal in the data recovery process. In fact, studies have indicated that receiver performance in C/I-limited cellular systems can be significantly improved by using co-channel interference rejection (IR) techniques. Co-channel IR techniques require an initial identification of the interferers, which may be accomplished by finding the training sequences of all received interfering signals. The training sequences may be found by correlating each received sequence with all possible training sequences that are used in the C/I-limited cellular system.

Correlation of a known (e.g., training) sequence with a sequence of samples can be computed according to the correlation definition; in other words, the correlation may be computed as an inner product of the known sequence with the sample sequence at each of a number of offsets. Unfortunately, the computational complexity of the correlation calculation grows with the training sequence length, with the number of training sequences, and with the number of offsets considered. It should be noted that a large number of offsets must ordinarily be considered because different base stations (BSs) will not generally be synchronized. The resulting large number of operations required for solving the correlation equation causes a high cost in terms of hardware requirements, processing time delays, and power dissipation demands.

SUMMARY OF THE INVENTION

The deficiencies of the prior art are overcome by the method, system, and apparatus of the present invention. For example, as heretofore unrecognized, it would be beneficial to reduce the number of operations required when calculating a correlation between a known sequence and a sample sequence. In fact, it would be beneficial if the number of add/subtract operations per additional input sample required to calculate correlates were reduced by eighty percent (80%) when identifying potential interferers in a wireless communications system.

In accordance with an embodiment of the present invention, the number of operations for calculating correlates may be significantly reduced by taking advantage of certain properties of the training sequences of a given wireless communications system. In a GSM wireless communications system, for example, a straightforward implementation requires two hundred (200) add/subtract-operations per additional input sample to calculate the correlates with eight (8) sequences, each of which is composed of twenty-six (26) elements. In contrast, an implementation in accordance with an embodiment of the present invention advantageously only requires forty (40) add/subtract-operations per additional input sample.

Interference rejection improves the extraction of information from a desired signal that is received along with interfering signals. For an interfering signal to be rejected, the interfering signal must first be identified. An interfering signal may be identified based on a comparison between a received sequence of signals and expected training sequences. Specifically, if a correlation between a received sequence of signals, or an offset thereof, and one of multiple training sequences is sufficiently high, then an interfering signal has been identified, and it may therefore be subsequently rejected. A correlation between a received sequence of signals and a training sequence may be determined based on the definition (e.g., a summation of the products of values of the received sequence and values of the training sequence). A determination of the correlation equation, if performed in a straightforward manner based on the definition, is a processing intensive task as a result of the number of mathematical operations involved. The present invention enables the number of mathematical operations to be significantly reduced.

In a first embodiment in accordance with the present invention, the correlation equation is manipulated to produce a sum that may be reused for each training sequence. In a second embodiment, the number of mathematical operations is reduced by manipulating the correlation equation such that many of the products would be zero if calculated. In a third embodiment, repeated subsequences in the training sequences are relied on to reduce the number of products that must be calculated. In a fourth embodiment, common subexpressions are eliminated. In a fifth embodiment, the negative of the correlation equation is selectively calculated when the corresponding number of mathematical operations is less than when calculating the standard, non-negative correlation. In a sixth embodiment to reduce the number of mathematical operations involved in calculating the correlation result, any two or more of the first through the fourth embodiments are synergistically combined so as to further reduce the number of mathematical operations involved in determining the correlates. The results of one or more of these manipulations may be advantageously implemented in a receiver to improve the calculation of correlates, which consequently reduces the processing intensity involved in identifying potential interferers.

The technical advantages of the present invention include, but are not limited to, the following. It should be understood that particular embodiments may not involve any, much less all, of the following exemplary technical advantages.

An important technical advantage of the present invention is that it reduces the hardware requirements, processing time delays, and power dissipation demands otherwise involved when identifying potential interferers.

Another important technical advantage of the present invention is that it enables the calculation of the correlates of a signal using up to eighty percent (80%) fewer add/subtract operations per additional input sample in a GSM implementation.

Yet another important technical advantage of the present invention is the ability to tailor specific embodiments to the training sequences of other communication standards.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method, system, and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

An embodiment of the present invention and its advantages are best understood by referring to FIGS. 1–5 of the drawings, like numerals being used for like and corresponding parts of the various drawings.

Aspects of the air interface for the GSM standard will be used to describe an embodiment of the present invention. However, it should be understood that the principles of the present invention are applicable to other wireless communication standards (or systems), especially those that involve training sequences (or their equivalent).

Figure 1:
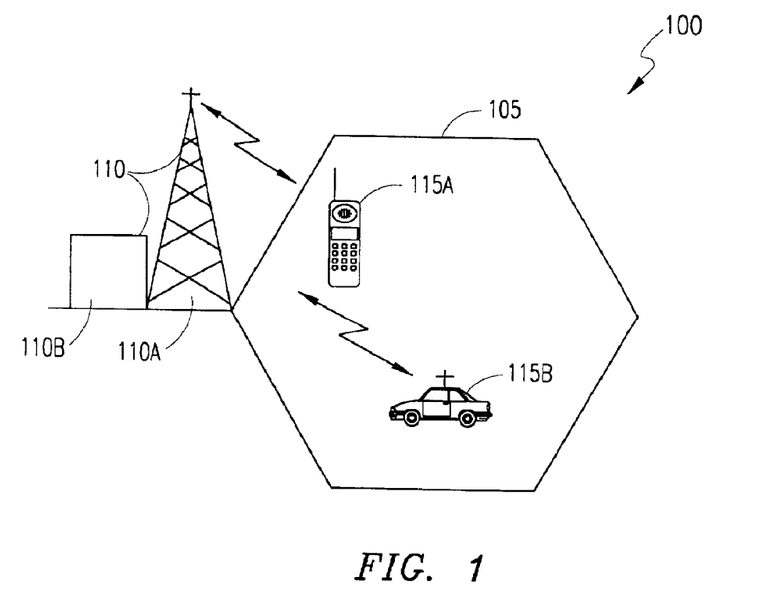
FIG. 1 illustrates a portion of an exemplary wireless communications system with which the present invention may be advantageously employed.

Referring now to FIG. 1, a portion of an exemplary wireless communications system with which the present invention may be advantageously employed is illustrated generally at 100. The (portion of) wireless communications system 100 includes a cell 105 that is served by a BS 110. The BS 110 typically includes a base transceiver station (BTS) 110A and optionally includes a BS controller (BSC) 110B. Within the cell 105 are multiple MTs 115A and 115B, each of which may be in communication with the wireless network infrastructure as represented by BS 110. Each MT 115 may be, for example, a hand-held cellular phone (e.g., the MT 115A), a vehicle-mounted MT (e.g., the MT 115B), a data terminal with a wireless link (not specifically shown), etc. While only two MTs 115 are shown in the wireless communications system 100, many more MTs 115 are usually present within the cell 105. Also, it should be noted that the wireless communications system 100 is usually composed of many such cells 105 and BSs 110.

Figure 2:
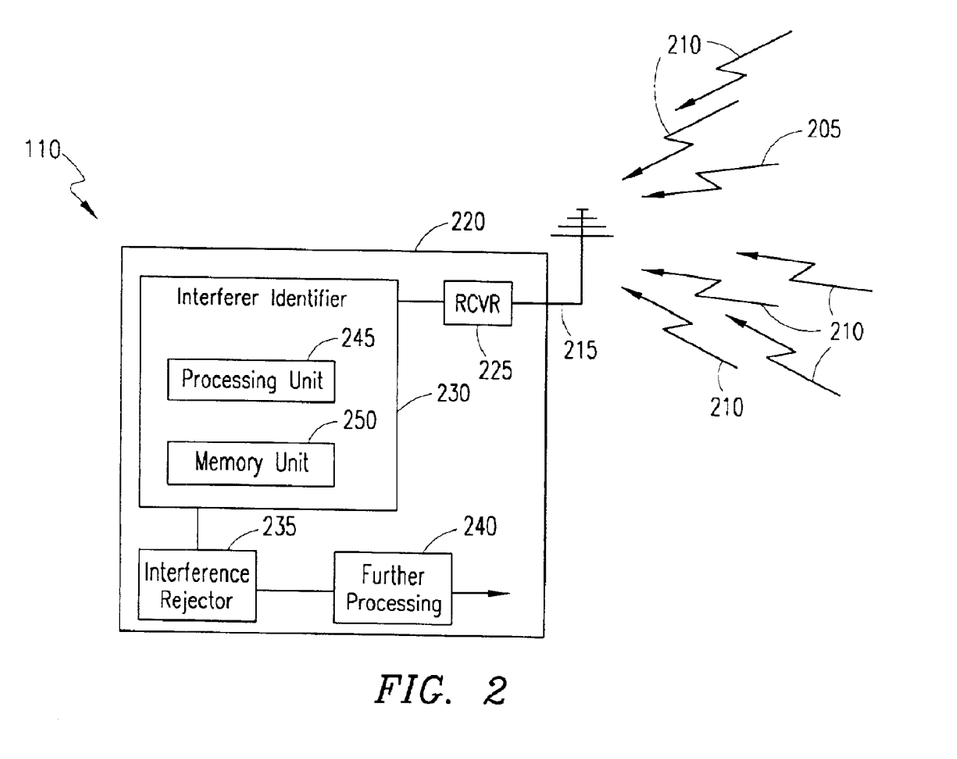
FIG. 2 illustrates an exemplary base station in accordance with the present invention.

Referring now to FIG. 2, an exemplary base station in accordance with the present invention is illustrated generally at 110. The BS 110 may receive a desired signal 205 along with multiple interfering signals 210 in a C/I-limited wireless communications system. The desired signal 205 typically originates from within the cell 105 while the interfering signals 210 typically originate from other cells (not specifically shown) of the wireless communications system 100. The desired signal 205 and the interfering signals 210 may be received at an antenna (e.g., a single antenna, an antenna array, etc.) 215 of the BS 110. The BS 110 also includes a transceiver portion 220, which may be part of the BTS 110A, the BSC 110B, etc. It should be understood that interference identification in accordance with the present invention may be accomplished in other parts of the wireless communications system 100 (e.g., a Mobile Services Switching Center (MSC) (not specifically shown)).

The signals 205 and 210 may be received at the antenna 215 and routed to a receiver 225 of the transceiver portion 220. The receiver 225 forwards the received signals 205 and 210 to an interference identifier 230. Once the interfering signals 210 have been identified, the interfering signals 210 are separated from the desired signal 205 at an interference rejector 235. Subsequently, the desired signal 205 is subjected to further processing (e.g., at block 240). It should be understood that in practice the desired signal 205 and the multiple interfering signals 210 are jointly detected, and only the data/information from the desired signal 205 is retained. The interference identifier 230 may be used to identify the interfering signals 210 based on detection of received sequences (e.g., by correlation with all possible training sequences). It should be noted that the interference identifier 230, the interference rejector 235, and/or the further processing block 240 need not be part of the transceiver portion 220.

The interference identifier 230 may include a processing unit 245 and a memory unit 250. The processing unit 245 may be composed of a digital signal processor (DSP) while the memory unit 250 may therefore include instructions for operating the DSP in accordance with the present invention. Alternatively, the processing unit 245 may be composed of an application specific integrated circuit (ASIC), a general-purpose microprocessor, etc. In another alternative, the memory unit 250 may be a circular buffer, a random access memory (RAM) (e.g., dynamic, static, etc.), a programmable read only memory (PROM) (e.g., an electrically-erasable PROM (EEPROM), etc.), etc. Other alternatives, including combinations of the above, are possible. It should be understood that the principles of the present invention are not limited by the type of processing unit(s) 245, memory unit(s) 250, or general logic module(s) (not specifically shown) involved in realizing an embodiment in accordance with the present invention. It should also be understood that the principles of the present invention are applicable to receivers of communication stations in general, such as, for example, receivers in a MT-type, a BS-type, etc. communication station.

In wireless communication systems, intersymbol interference (ISI), which distorts the transmitted signal, is caused by multipath in bandlimited time dispersive channels. Equalization involves processing a received signal so as to minimize ISI. Equalizers are periodically updated to minimize the ISI by evaluating a received sequence as compared to an expected sequence. Tap weights of the equalizer are adjusted such that the received sequence is interpreted as the expected sequence to thereby reduce the ISI for portions of the signal that contain no expected value (e.g., sequence). The expected sequence is commonly termed a training sequence. By detecting a training sequence, an adaptive algorithm in a receiver of the wireless communications system is able to calibrate the receiver until a subsequent training sequence is received, at which point the calibration is repeated.

Figure 3A:
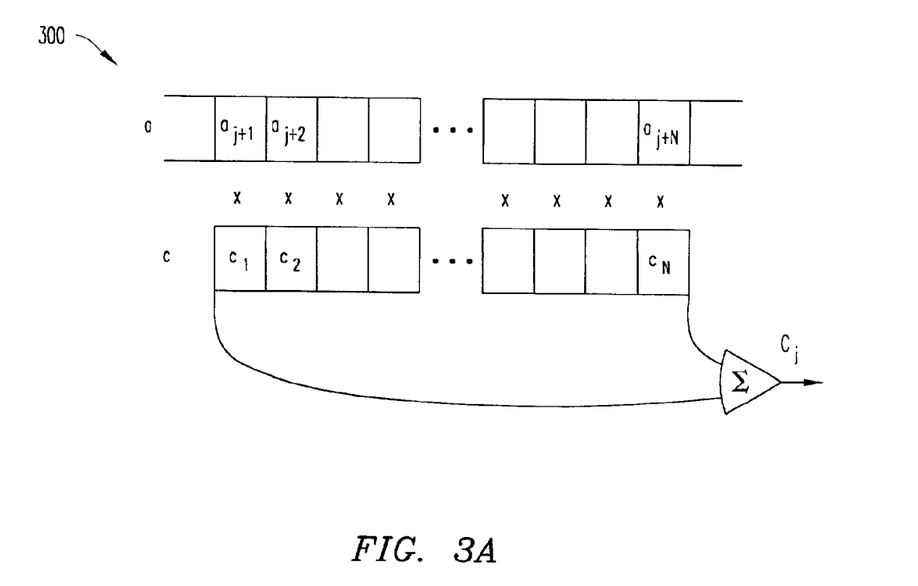
FIG. 3A illustrates a calculation of a correlate in graphical form according to the definition of a correlate.

Referring now to FIG. 3A, a calculation of a correlate in graphical form according to the definition of a correlate is illustrated generally at 300. The correlate, $C_j$, of a sequence of received samples, $a_n$, with respect to a certain training sequence, $c_i$, i=1, ..., N, at a certain offset, j, can be defined as follows:

$$C_j = \sum_{i=1}^{N} (a_{i+j} \cdot c_i) \quad (0)$$

The graphical calculation 300 illustrates how the correlate $C_j$ is calculated from the stream of samples $a_n$ and the training sequence $c_i$. The stream of samples $a_n$ is position-wise multiplied with the fixed training sequence $c_i$, i–1, ..., N. The correlate is computed as the sum of N product terms. It should be understood that the values illustrated in the graphical calculation 300 may correspond to memory locations and that the summing element may correspond to a adder.

For the graphical calculation 300, N multiplications and N−1 additions are needed to carry out the calculation (of Equation (0)). The offset, j, is incremented for every new sample. For each new value of j, the entire calculation must be performed again. Moreover, when correlates with respect to several training sequences are to be calculated in parallel, the number of operations grows as the number of training sequences increases. For GSM systems where N=26, the total number of training sequences is eight (8). Consequently, the overall number of operations per additional input sample is 208 [=26×8] multiplications and 200 [=(26−1)×8] additions when correlates are calculated according to the definition as presented by Equation (0). Advantageously, application of the principles of the present invention significantly reduces the required number of overall operations.

Figure 3B:
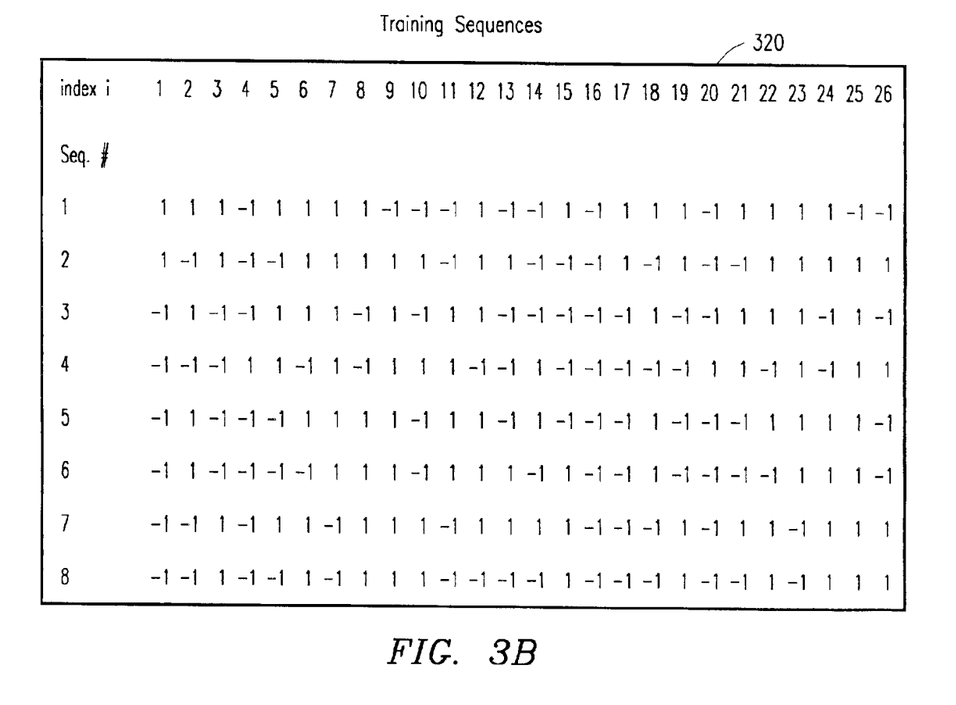
FIG. 3B illustrates a table of training sequences in accordance with both the current GSM standard and an embodiment of the present invention.
Figure 4:
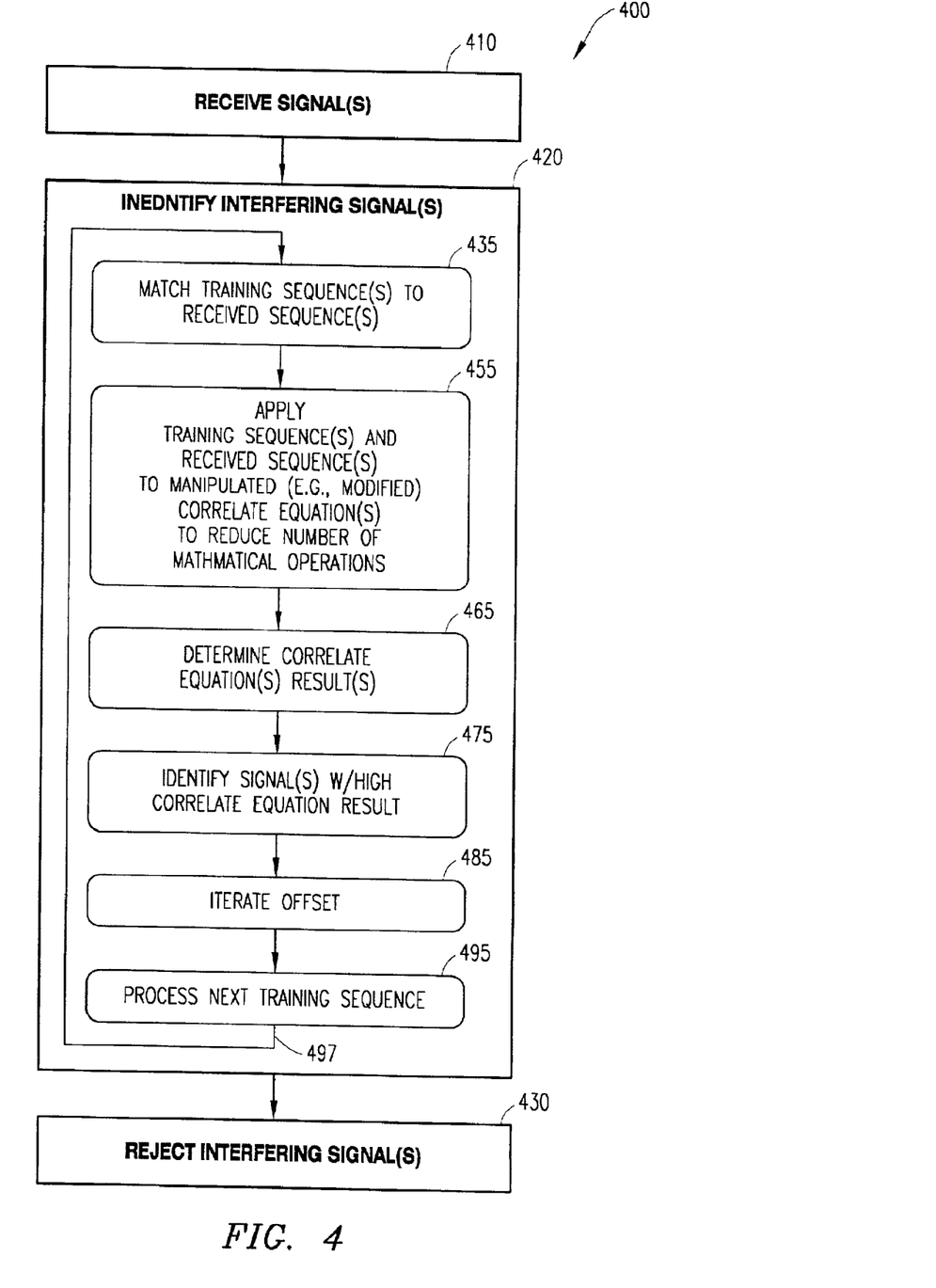
FIG. 4 illustrates an exemplary method in flowchart form for rejecting interfering signals in accordance with the present invention.

Referring now to FIG. 4, an exemplary method in flowchart form for rejecting interfering signals in accordance with the present invention is illustrated generally at 400. Initially, the receiver receives signal(s) (block 410). The interfering signal (s) from among the received signal(s) are identified (block 420), and the interfering signal (s) may be rejected thereafter (block 430). To identify the interfering signal(s) (at block 420), the received signal(s) are matched to training sequence(s) (e.g., the training sequences of table 320 (of FIG. 3B)) (block 435). Manipulated correlate equation(s) are formed from the training sequence(s) and the received sequence(s) by applying the training sequence(s) and the received sequence(s) to manipulated (e.g., modified) correlate equation(s) (block 455). The manipulated correlate equation(s) are/have been manipulated in manners in accordance with the present invention as described in further detail hereinbelow to reduce the number of mathematical operations required to evaluate the correlate equation(s). A manipulated correlate equation implies that a determination of a correlate equation has been optimized using one, two, or more of the below-described embodiments.

After forming the manipulated correlate equation(s) to consequently reduce the processing burden of determining result (s) thereof, the result(s) of the manipulated correlate equation(s) are determined (block 465). In other words, by using the manipulated correlate equation(s) in accordance with embodiments of the present invention, the number of calculations (e.g., additions) to calculate a correlation is reduced as compared to a straight-forward implementation. Signal(s) associated with/corresponding to a high correlate equation result are identified as at least potential interferers (block 475). The offset at which the received sequence(s) is correlated to the training sequence(s) is iterated (block 485), and blocks 455, 465, and 475 may be repeated (not specifically indicated in flowchart 400 by an arrow) for the next sample of the received sequence(s). The identification of interfering signal(s) (at block 420) may continue thereafter with another training sequence (block 495) as indicated by the arrow 497.

Referring now to FIG. 3B, a table of training sequences in accordance with both the current GSM standard and an embodiment of the present invention is illustrated generally at table 320. In GSM wireless communications systems, eight (8) training sequences are defined by the current standard. Each of the eight (8) training sequences (designated "Seq. #") includes twenty-six (26) entries (designated "index 'i'"). As illustrated by the table 320, when bits are mapped to IQ coordinates, the GSM training sequences may be written as a series of "1" and "−1". The training sequences as presented in the table 320 have some special properties that enable the number of calculations required to compute the set of correlates to be reduced in accordance with the present invention.

With regard to the table 320, it is noted that each training sequence, $c_i$, $i=1, \ldots, N$, is composed of only the values "1" and "−1". It is therefore possible to completely avoid performing any multiplication operations by instead adding (when $c_i$="1") and subtracting (when $c_i$="−1") the appropriate $a_n$ values from a running sum. The total computation is thus entirely reduced to additions and subtractions.

With regard to the table 320, it is further noted that each training sequence, $c_i$, $i=1, \ldots, N$, is composed of only two distinct values (namely, "1" and "−1"). The correlate $C_j$ with respect to a certain sequence $a_i$ at a certain offset j can be written as:

$$C_j = \sum_{i=1}^{N} (c_i \cdot a_{i+j}) = 2\sum_{i=1}^{N} \left(\frac{(c_i+1)}{2} \cdot a_{i+j}\right) - \sum_{i=1}^{N} a_{i+j} = \qquad (1)$$

$$= 2\sum_{i=1}^{N} (d_i \cdot a_{i+j}) - \sum_{i=1}^{N} a_{i+j} = 2\sum_{i=1}^{N} (d_i \cdot a_{i+j}) - S_j$$

The sequence $d_i$ is defined as follows:

$$d_i = \begin{cases} 1 & c_i = 1 \\ 0 & c_i = -1 \end{cases} \qquad (2)$$

And $S_j$ is defined as follows:

$$S_j = \sum_{i=1}^{N} a_{i+j} \qquad (3)$$

With respect to a first embodiment in accordance with the present invention, it is noted that the index expression for the a term is symmetric in i and j. Consequently, it is "cheap" to update $S_j$ when the index/offset j has been incremented because the update may be accomplished merely by adding $a_{j+26}$ and subtracting $a_j$. More generally, $S_j$ may be updated using only two add/subtract operations:

$$S_j \leftarrow S_{j-1} - a_j + a_{j+N}.$$

It should also be noted that these operations should be executed with full precision because any roundoff errors will accumulate. Furthermore, as described further hereinbelow with reference to a second embodiment of the present invention and block 455B (of FIG. 4B), for those values of i where $d_i=0$, the value of the corresponding term in the sum goes to zero (0). These zero (0) terms may therefore be omitted from the sum without error.

Figure 3C:
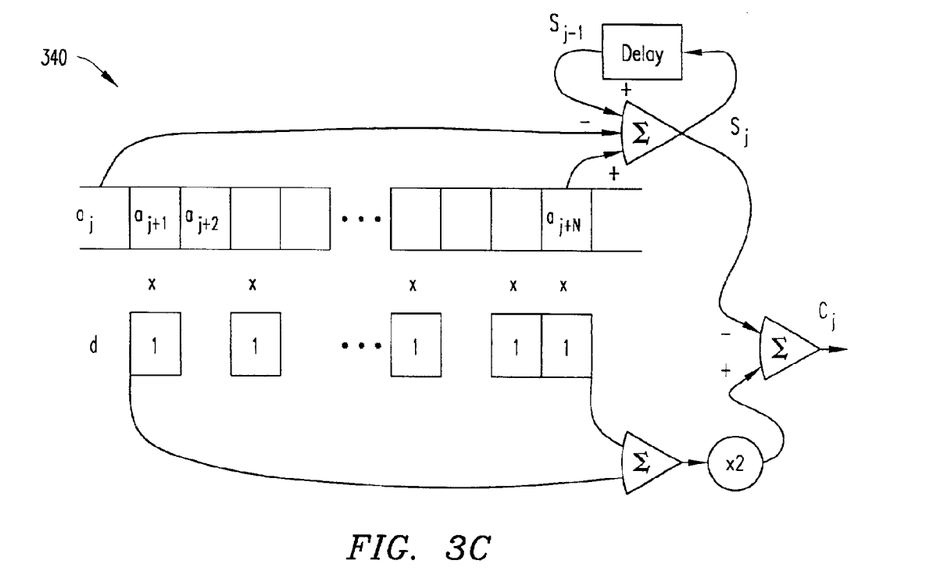
FIG. 3C illustrates an exemplary calculation of a correlate in graphical form in accordance with first and second embodiments of the present invention.

Referring now to FIG. 3C, an exemplary calculation of a correlate in graphical form in accordance with first and second embodiments of the present invention is illustrated generally at 340. The graphical calculation 340 illustrates the calculation of a single correlate $C_j$ according to the Equation (1). Terms where $d_i=0$ are omitted from the sum. It should be noted that the "multiplications by 1" are shown only for clarity; they need not be actually calculated. As indicated by the "delay" memory location, the value of $S_j$ may be retained and re-used when j is incremented. The graphical calculation 340 reduces the number of add/subtract operations required for each new offset because it is so "cheap" to update $S_j$.

Figure 3D:
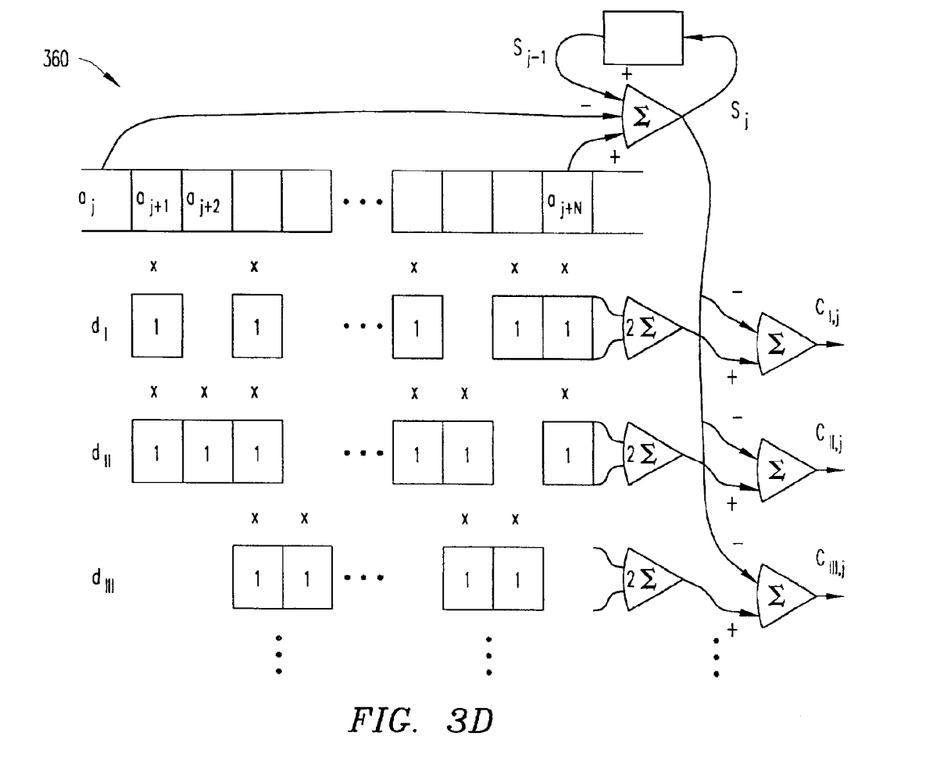
FIG. 3D illustrates another exemplary calculation of a correlate in graphical form in accordance with the first and second embodiments of the present invention.

It is also noted that $S_j$ is independent of the training sequence (values) and that it can therefore by shared among all the correlates. Consequently, when several correlates are computed in parallel, $S_j$ need be computed only once for each new value of j and used for all correlates. In other words, when the correlate equation is expressed as in Equation (1), some computational efforts may be amortized over several correlates. Referring now to FIG. 3D, another exemplary calculation of a correlate in graphical form in accordance with the first and second embodiments of the present invention is illustrated generally at 360. Three training sequences $c_i$ ($d_{I/II/III}$) are explicitly shown as being used to calculate three correlates $C_{I/II/III,j}$. Other correlates (e.g., five (5) more for GSM) may also be calculated. As indicated by the "delay" box, the running sum $S_j$ may advantageously be used in the calculation of correlates with respect to several training sequences.

Figure 4A:
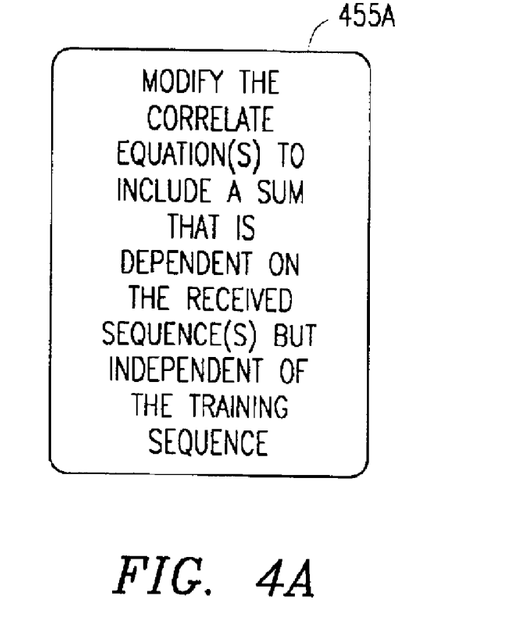
FIG. 4A illustrates an exemplary correlation equation manipulation in accordance with the first embodiment of the present invention.

Referring now to FIG. 4A, an exemplary correlation equation manipulation in accordance with the first embodiment of the present invention is illustrated at block 455A. As indicated by block 455A, the above described manipulation of the correlation equation modifies the correlate equation to include a sum (e.g., as in Equation (3)) that is dependent on the received sequences while remaining independent of the training sequences.

With respect to the multiple embodiments in accordance with the present invention, it should be understood that the correlate equation(s) manipulation(s) of blocks 455A–E (of FIGS. 4A–4E) may be effectuated before a receiver receives signals in use. For example, the manipulated equations may be incorporated into a receiver during the design phase (e.g., in an ASIC, when programming DSP code, etc.), may be determined prior to receiver use by the receiver or an associated processing unit (e.g., in a setup phase of a receiver for a new, modified, or otherwise different standard; in a calibration phase of a receiver; when accommodating new training sequences, etc.), etc. In other words, the manipulations may typically be established prior to utilizing the receiver (e.g., of a MT, BS, etc.) Consequently, the manipulations need not be repeated with any frequency (e.g., usually only as a result of a change to the number of training sequences, their length, their contents, etc.).

With respect to the second embodiment in accordance with the present invention, it is noted that a significant portion of the terms in Equation (1) "drop out" of the calculus (e.g., the products are zero) as a result of the manner in which the training sequences are presented in table 320. Specifically, to produce the eight (8) correlates, eight (8) sums are calculated (one for each correlate), each of which corresponds to the first summation in Equation (1). Each of these eight (8) sums contains $n_d$ non-zero first-order terms, where $n_d$ is the number of ones in the sequence $d_i$ corresponding to the respective training sequence (e.g., for an embodiment with training sequences as in table 320 (of FIG. 3B)), as presented mathematically in the following equation:

$$n_d = \Sigma d_i \qquad (4)$$

Figure 4B:
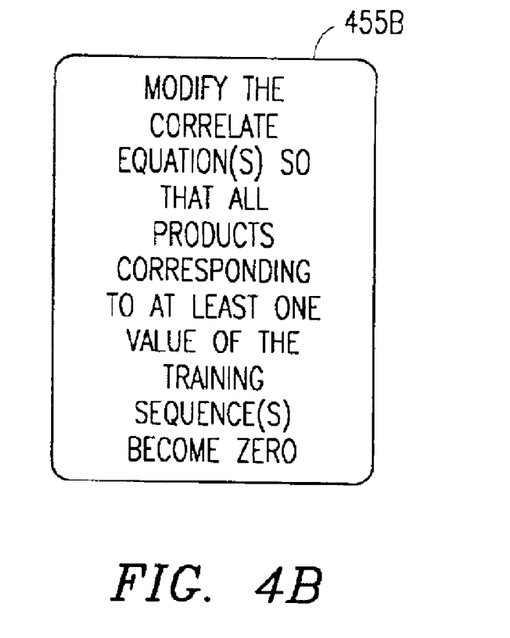
FIG. 4B illustrates an exemplary correlation equation manipulation in accordance with the second embodiment of the present invention.

Calculation of each sum therefore requires at most $n_d$−1 additions. About half of the values in each sequence in table 320 are one, which is typically the case. Thus, the mathematical operation count is reduced by approximately one-half in accordance with this second embodiment alone as compared to the straightforward implementation of FIG. 3A. (It should also be noted that a multiplication by "2" has been introduced, but multiplication by "2" is a cheap operation.) Referring now to FIG. 4B, an exemplary correlation equation manipulation in accordance with the second embodiment of the present invention is illustrated at block 455B. As indicated by block 455B, the above described manipulation of the correlation equation modifies the correlate equation(s)

so that all products corresponding to at least one value of the training sequence(s) become zero.

With respect to a third embodiment in accordance with the present invention, it is noted that the 26-bit GSM training sequences as listed in table 320 are based on 16-bit "core" sequences. The 16-bit sequences as provided by the standard are chosen to have good correlation properties. In other words, their autocorrelations are dirac-like and their mutual cross-correlations are small, regardless of offset. To each 16-bit "core" sequence, five (5) leading bits (which are identical to the last five (5) of the sixteen (16) bits) and five (5) trailing bits (which are identical to the last five (5) of the sixteen (16) bits) are added to form a 26-bit sequence. This improves the likelihood of making a quick channel estimate for situations in which the training sequence position is known to within five (5) symbol times (e.g., correlation with the original 16-bit sequence is bias-free).

Consequently, with respect to the calculation of the correlates with the full 26-bit sequences, it is noted that the last ten (10) bits of each training sequence are identical to the first ten (10) bits: $C_i = C_{i+16}$. This can be verified by comparing values in the table 320 (of FIG. 3B). Thus, $d_i = d_{i+16}$. Equation (1), with N values being equal to the exemplary 26 values, can therefore now be manipulated to:

$$C_j = 2\sum_{i=1}^{10}(d_i \cdot (a_{i+j} + a_{i+j+16})) + 2\sum_{i=11}^{15}(d_i \cdot a_{i+j}) - S_j = \tag{5}$$

$$= 2\sum_{i=1}^{10}(d_i \cdot b_{i+j}) + 2\sum_{i=11}^{15}(d_i \cdot a_{i+j}) - S_j$$

In Equation (5), $b_k = a_k + a_{k+16}$ is a second-order term.

Figure 3E:
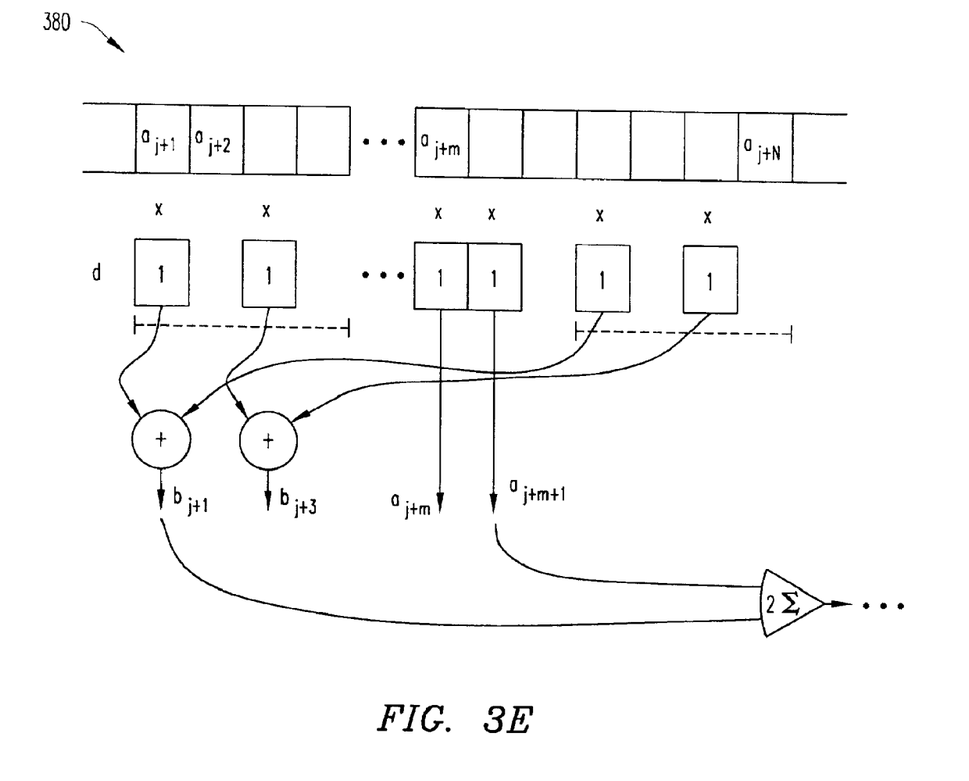
FIG. 3E illustrates an exemplary calculation of a correlate in graphical form in accordance with a third embodiment of the present invention.

Referring now to FIG. 3E, an exemplary calculation of a correlate in graphical form in accordance with the third embodiment of the present invention is illustrated generally at 380. In the graphical calculation 380, the second-order terms $b_k$ are introduced. Because the leading and trailing bits (as marked with dashed lines) of the sequence d are identical, each second-order term is given by the expression: $b_k = a_k + a_{k+16}$. As observable from the table 320 (of FIG. 3B), both possible values (e.g., "1" and "−1") occur for each of the values of the index i (with the exception of i=16). Consequently, each of the a and b terms in Equation (5) (with the exception of the first order term $a_{16}$) contributes to some of the respective eight (8) correlates, but not to all of them. As a result, all of the second-order terms should be updated for every new offset j. The corresponding computational effort equates to ten (10) additions.

Of these ten (10) additions, nine (9) may be avoided by implementing the following method: The index expression of the b term is symmetric in i and j. Consequently, when j is incremented, only one new b term need be calculated. The other terms are already available from the previous value of j, and this previous value of j may be reused:

$b_{j+1} \leftarrow b_{j+2}$ $\ldots$ $b_{j+9} \leftarrow b_{j+10}$ $b_{j+10} \leftarrow a_{j+10} + a_{j+26}$.

Multiple values of the received sequence that correspond to single, identical (due to repetition) values in the training sequence may be added together prior to multiplication, thus saving multiplications equal to, for example, the number of repeated values. In Equation (5), $b_k = a_k + a_{k+16}$ is a second-order term. Notably, the index expression of the b term is symmetric in i and j. As a result, when j is incremented, advantageously only one new b term need be calculated. The other terms are already available from the previous value of j and may therefore be "reused". (It should also be noted that another multiplication by "2" has been introduced, but multiplication by "2" is a cheap operation.)

Figure 4C:
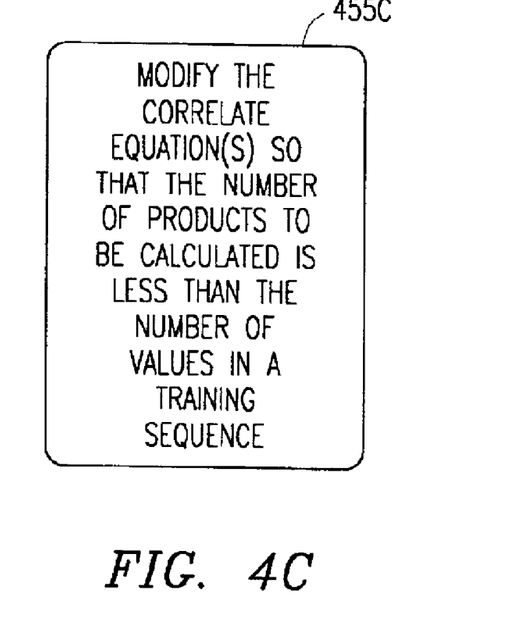
FIG. 4C illustrates an exemplary correlation equation manipulation in accordance with the third embodiment of the present invention.

Referring now to FIG. 4C, an exemplary correlation equation manipulation in accordance with the third embodiment of the present invention is illustrated at block 455C. As indicated by block 455C, the above described manipulation of the correlation equation modifies the correlate equation(s) so that the number of products to be calculated is less than the number of values in a training sequence. Specifically, in this GSM example, because ten (10) values (e.g., a ten-value subsequence, two (2) five-value subsequences, etc.) are repeated within the 26-bit training sequence according to the GSM standard, only sixteen (16) products need to be calculated (e.g., 26 original bits minus 10 repeated bits results in 16 remaining, non-repeated bits to be multiplied). It should be understood that the real value to the third embodiment, when used in conjunction with the second embodiment, derives from a reduction in the number of additions because no product is actually calculated in practice (since $d_i$ is either one (1) or zero (0)).

In accordance with at least one embodiment of the present invention, a method for correlating a received sequence to a known sequence in a communications system includes receiving a sequence of values, applying the sequence of values to at least one known sequence of values in a correlation equation, the correlation equation definable as including a sum of products of the sequence of values and the at least one known sequence of values, the at least one known sequence of values including a known number of values and at least two identical subsequences of values. The method further includes determining a correlation result of the correlation equation using a sum of products whose number of product addends is less than the known number of the known number of values, wherein the correlation equation has been manipulated such that the number of product addends of the sum of products is less than the known number of the known number of values by eliminating products of one of the at least two identical subsequences of values.

Figure 5:
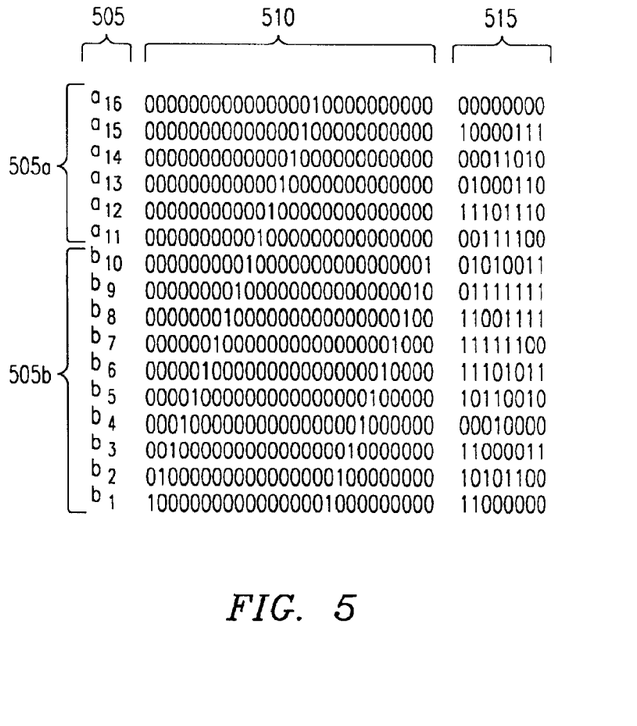
FIG. 5 illustrates a table of an exemplary correspondence between first and second-order terms and correlates in accordance with the present invention.

With respect to a fourth embodiment in accordance with the present invention, it is reemphasized that each of the a and b terms in Equation (5) (with the exception of $a_{16}$) contributes to some of the eight (8) correlates, but not to all of them. (It is noted that the j term is dropped from the index expressions hereinbelow for the sake of simplicity.) With reference now to FIG. 5, a table of an exemplary correspondence between first and second-order terms and correlates in accordance with the present invention is illustrated at table 500. Correlate equation terms 505 are composed of first-order terms 505a and second-order terms 505b. The table 500 also lists the indices of the a terms 510 from one (1) to twenty-six (26). For example, the $b_4$ second-order term is noted to be the sum of the $a_4$ and the $a_{20}$ terms because the second-order b terms correspond to pairs of first-order a terms in accordance with Equation (5). Furthermore, the table 500 includes 8-bit words 515 that indicate to which of the eight (8) correlates each a (and b) term contributes. Thus, the term $a_{11}$ contributes to the third, fourth, fifth, and sixth correlates.

It is noted that common subexpression elimination may be applied when referring to the table 500 to minimize the number of mathematical operations needed to produce the eight (8) correlates from the first-order and second-order terms. It is beneficial to "reuse" as many of the partial results as possible in the calculations of the different correlates. An exemplary result of such "reuse" is shown below (where t represents "third-order (intermediate) terms" and r represents the results):

$$t_1 = a_{12} + b_2 + b_{19}$$

$$t_2 = b_3 + b_6 + b_9$$

$$t_3 = b_9 + b_{10} + t_2$$

$$t_4 = a_{12} + b_1 + b_7$$

$$t_5 = a_{11} + b_7 + b_9$$

$$t_6 = b_6 + t_1$$

$$t_7 = a_{15} + b_5$$

$$t_8 = a_{13} + t_3$$

$$r_1 = a_{15} + t_3$$

$$r_2 = a_{12} + a_{14} + t_7 + t_8$$

$$r_3 = a_{13} + a_{15} + b_8 + t_1$$

$$r_4 = a_{14} + b_9 + t_6$$

$$r_5 = a_{14} + b_4 + b_5 + b_{10} + t_5$$

$$r_6 = b_5 + t_6$$

$$r_7 = t_4 + t_6$$

$$r_8 = b_2 + t_2 + t_4 + t_7$$

Figure 4D:
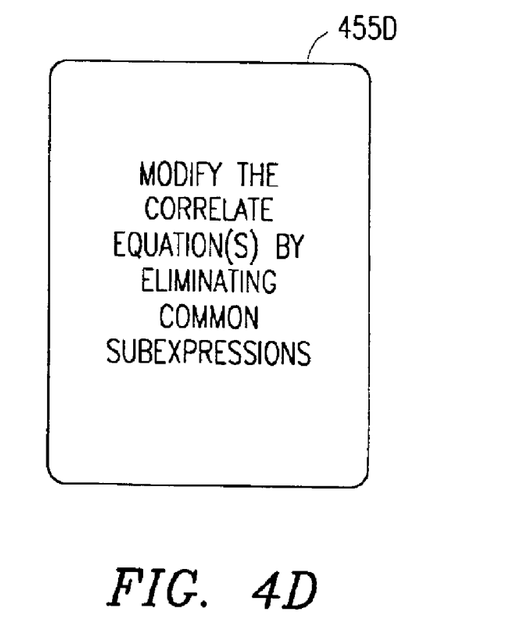
FIG. 4D illustrates an exemplary correlation equation manipulation in accordance with a fourth embodiment of the present invention.

The total number of additions above is thirty-one (31). The correlates may then be formed by subtracting $S_j$ from double the r values. In total, each new sample (i.e., each new offset value of j in Equation (1)) requires 42 add/subtract operations in an exemplary GSM embodiment. Specifically, one (1) operation is required to produce the new second-order b term, thirty-one (31) are required to produce the eight (8) separate r values, two (2) are necessary for updating $S_j$, and eight (8) operations are needed to subtract $S_j$ from 2·r, which ultimately produces the correlates. Referring now to FIG. 4D, an exemplary correlation equation manipulation in accordance with the fourth embodiment of the present invention is illustrated at block 455D. As indicated by block 455D, the above described manipulation of the correlation equation modifies the correlate equation(s) by eliminating common subexpressions to thereby "reuse" intermediate values in the determination of the final results.

In accordance with at least one embodiment of the present invention, a method for correlating a received sequence to known sequences in a communication system includes providing a plurality of known sequences of values, receiving a sequence of values, and producing at least one reusable addend. The method further includes applying the sequence of values to each known sequence of values of the plurality of known sequences of values to produce respective sets of addends, each set of addends of the respective sets of addends corresponding to a respective known sequence of values of the plurality of known sequences of values and including the at least one reusable addend. The method still further includes determining respective correlation results responsive to the respective sets of addends, each respective correlation result corresponding to a correlation between the sequence of values and a respective known sequence of values of the plurality of known sequences of values, wherein each set of addends of the respective sets of addends have been reduced in number utilizing a common subexpression elimination algorithm.

With respect to a fifth embodiment in accordance with the present invention, it is noted that the values of $n_d$ for the GSM training sequences of the table 320 range from eleven (11) to sixteen (16) When $n_d > 13$, fewer first-order terms are required for computing $-C_j$ than for computing $C_j$. The sign of a correlate matters only if the absolute value of the correlate is sufficiently large. If the absolute of the correlate is not sufficiently large, then no interfering signal corresponding to that training sequence is present, and the value may be disregarded. In accordance with this fifth embodiment, $-C_j$ is computed when it requires fewer operations and then the sign is changed only when the correlate is to be subjected to further processing as an interferer (which is rarely in most real-world applications)

The determination as to whether to compute $C_j$ or $-C_j$ for each training sequence is analyzed in light of the interdependence resulting from the common subexpression elimination (when the fourth and fifth embodiments are jointly implemented). It must be considered during the analysis that the overall lowest computational cost may not necessarily be achieved by selecting the sign that creates the lowest computational cost for each correlate individually. For the GSM training sequence set as presented in the table 320, the overall lowest operations count (e.g., 1+29+2+8=40) is achieved when the correlates with respect to the second and seventh training sequences are inverted. It should be noted that several combinations of three or more inversions yield the same operation count. The corresponding operations are as follows ($C_j$ is computed as $2r_j - S_j$ and $-C_j$ as $2^- r_j + S_j$, as appropriate, where "$^-$r" represents the inverse of "r"):

$$t_1 = b_2 + b_7$$

$$t_2 = a_{11} 30 \; a_{12} + b_9 + t_1$$

$$t_3 = a_{11} + b_4$$

$$t_4 = a_{14} + b_5 + t_3$$

$$t_5 = a_{15} + b_8$$

$$t_6 = b_3 + b_6 + t_5$$

$$t_7 = b_1 + t_1$$

$$t_8 = b_6 + t_2$$

$$t_9 = b_9 + b_{10}$$

$$r_1 = a_{12} + b_5 + t_6 + t_7$$

$$\_r_2 = a_{15} + a_{16} + b_2 + t_4$$

$$r_3 = b_5 + t_8$$

$$r_4 = b_7 + t_4 + t_9$$

$$r_5 = a_{14} + b_8 + t_8$$

$$r_6 = a_{13} + t_2 + t_5$$

$$^- r_7 a_{16} + t_3 + t_7$$

$$r_8 = t_6 + t_9$$

Figure 4E:
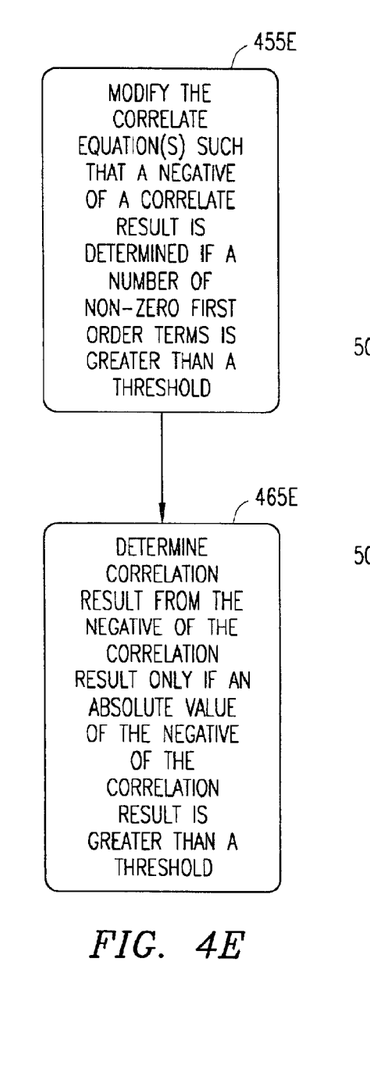
FIG. 4E illustrates an exemplary correlation equation manipulation in accordance with a fifth embodiment of the present invention.

Referring now to FIG. 4E, an exemplary correlation equation manipulation in accordance with the fifth embodiment of the present invention is illustrated at block 455E (see also related block 465E). As indicated by block 455E, the above described manipulation of the correlation equation (or the calculation of the result(s) thereof) modifies the correlate equation(s) such that a negative of a correlate result is determined if a number of non-zero first-order terms is greater than a (predetermined) threshold. This implies that the number of operations to calculate the overall set of correlates for all training sequences is minimized to the extent possible by selectively calculating $C_j$ or $-C_j$ for each given training sequence. And as indicated by block 465E, the actual correlation result, for those training sequences for which the inverted correlate was calculated, is determined only if the absolute value of the inverted correlate is greater than a (predetermined) threshold.

In accordance with at least one embodiment of the present invention, a method for correlating a received sequence to known sequences in a communications system includes providing a first known sequence of values, providing a second known sequence of values, receiving a sequence of values, and producing a common addend responsive to the sequence of values. The method further includes applying the sequence of values to the first known sequence of values at a plurality of offsets to produce a first set of addends, the first set of addends including the common addend. The method further includes applying the sequence of values to the second known sequence of values at the plurality of offsets to produce a second set of addends, the second set of addends including the common addend. The method still further includes calculating a first correlate based, at least in part, on the first set of addends, and calculating a second correlate based, at least in part, on the second set of addends, wherein the first set of addends and the second set of addends are determined, at least partially, by a common subexpression elimination analysis. In still another embodiment of the present invention, the method further includes wherein the producing of the common addend responsive to the sequence of values further includes adjusting the common addend responsive to an offset value of the plurality of offsets.

With respect to a sixth embodiment in accordance with the present invention, it is noted that any two or more of the first through the fifth embodiments, as described herein above, may be advantageously combined to synergistically further reduce the number of mathematical operations required to produce the correlates. As noted above, implementing all of the first through the fifth embodiments in a GSM wireless network can reduce the number of mathematical operations to one-fifth (⅕) of the number required in a straightforward correlation calculation.

The embodiments described above may be applied in various situations. For example, the principles of the present invention may by applied to calculations of multiple correlation values in wireless systems other than GSM. However, it should be understood that certain embodiments are particularly advantageous in particular situations, depending, for example, on the particular properties of (i) the training sequences and (ii) the overall training sequence set. As a first example, the first and second embodiments are particularly advantageous when the training sequences are composed of two distinct values (e.g., "+1" and "−1"). Situations with two distinct values are the most-common cases. Extensions of the first and second embodiments to cases with more than two values are possible, but the benefit is typically less. As a second example, because the third embodiment is at least partially based on how the current GSM training sequences are constructed, the third embodiment is particularly applicable when the sequences (e.g., training sequences) contain repeated subsequences.

As a third example and with respect to the fourth embodiment, it should be noted that a small change in the subexpression tree may produce an identical result at very similar cost. And as a fourth example, the fifth embodiment is likely to be particularly helpful when the values of $n_d$ span a wide range. However, the fifth embodiment is not guaranteed to be helpful because the influence of the common subexpression elimination (e.g., of the fourth embodiment) is unpredictable, but the probability of finding a combination that features a greater number of common subexpressions grows as $2^N$, when N is the number of correlates. For GSM where N=8, among the resulting two hundred and fifty-six (256) combinations, several exist that reduce the overall operation count by two (2) (e.g., by approximately five percent (~5%)).

It should also be noted that particular embodiments are particularly beneficial in certain implementations (e.g., DSP, ASIC, etc.). For example, the third embodiment benefits from modulo addressing of a circular buffer, but it is therefore economically less useful if the cost of memory is larger than the cost of an addition. Also, if operations are performed on a DSP, the executable code for the transformed algorithm may be larger than the original code (e.g., because the transformations reduce the regularity of the initial description). Other constraints and/or factors to consider will become apparent to one skilled in the art after reading and understanding the principles of the present invention.

It should further be noted that common subexpression elimination as described hereinabove with respect to the fourth embodiment focuses on minimizing the number of add/subtract operations. Other optimization criteria may also be considered, depending on what is appropriate for the implementation technology. An important property to consider in the context of realizing the fourth embodiment in a particular environment is that some intermediate results produced in the computation of one correlate are advantageously re-used to form other correlates.

Although preferred embodiment(s) of the method, system, and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for correlating a received sequence to known sequences in a communications system, comprising the steps of:

providing a plurality of known sequences of values;

receiving a sequence of values;

producing at least one reusable addend;

applying said sequence of values to each known sequence of values of said plurality of known sequences of values to produce respective sets of addends, each set of addends of said respective sets of addends corresponding to a respective known sequence of values of said plurality of known sequences of values and including said at least one reusable addend;

determining respective correlation results responsive to said respective sets of addends, each respective correlation result corresponding to a correlation between said sequence of values and a respective known sequence of values of said plurality of known sequences of values; and wherein said each set of addends of said respective sets of addends have r been reduced in number utilizing a common subexpression elimination algorithm.

2. The method of claim 1, wherein said each known sequence of values of said plurality of known sequences of values includes a plurality of +1 values and a plurality of −1 values.

3. The method of claim 1, wherein said step of producing at least one reusable addend comprises the step of producing said at least one reusable addend responsive to said sequence of values.

4. The method of claim 1, wherein said each known sequence of values of said plurality of known sequences of values comprises a training sequence.

5. The method of claim 1, wherein said communications system comprises a wireless Communications system operating substantially in accordance with the Global System for Mobile Communications (GSM) standard.

6. The method of claim 1, wherein said step of applying said sequence of values to each known sequence of values of said plurality of known sequences of values to produce respective sets of addends comprises the step of applying said sequence of values to said each known sequence of values of said plurality of known sequences of values in a plurality of manipulated correlation equations.

7. The method of claim 1, further comprising the steps of:
determining whether said each respective correlation result meets a predetermined criterion; and
if so, initiating at least one algorithm for detecting and rejecting a signal associated with said each respective correlation result.

8. The method of claim 1, wherein said step of applying said sequence of values to each known sequence of values of said plurality of known sequences of values to produce respective sets of addends comprises the step of applying said sequence of values at a plurality of offsets to said each known sequence of values of said plurality of known sequences of values.

9. A method for correlating a received sequence to a known sequence in a communications system, comprising the steps of:
receiving a sequence of values;
applying said sequence of values to at least one known sequence of values in a correlation equation, said correlation equation definable as including a sum of products of said sequence of values and said at least one known sequence of values;
determining a correlation result of said correlation equation using a sum that is independent of said at least one known sequence of values; and
wherein said correlation equation has been manipulated to produce said sum that is independent of said at least one known sequence of values.

10. The method of claim 9, wherein said sum that is independent of said at least one known sequence of values is dependent on said sequence of values and offsets thereof.

11. The method of claim 9, further comprising the step of updating said sum that is independent of said at least one known sequence of values when an offset is being incremented or decremented using no more than two values of said sequence of values.

12. A method for correlating a received sequence to a known sequence in a communications system, comprising the steps of:
receiving a sequence of values;
applying said sequence of values to at least one known sequence of values in a correlation equation, said correlation equation definable as including a sum of products of said sequence of values and said at least one known sequence of values, said at least one known sequence of values including a known number of values and at least two identical subsequences of values;
determining a correlation result of said correlation equation using a sum of products whose number of product addends is less than said known number of said known number of values; and
wherein said correlation equation has been manipulated such that said number of product addends of said sum of products is less than said known number of said known number of values by eliminating products of one of said at least two identical subsequences of values.

13. The method of claim 12, wherein said number of product addends of said sum of products is less than said known number of said known number of values by a number equal to a length of each of said at least two identical subsequences of values.

14. The method of claim 12, wherein at least one product addend of said number of product addends comprises a multiplication by 1 that requires no mathematical operation.

15. A method for correlating a received sequence to known sequences in a communications system, comprising the steps of:
providing a first known sequence of values;
providing a second known sequence of values;
receiving a sequence of values;
producing a common addend responsive to said sequence of values;
applying said sequence of values to said first known sequence of values at a plurality of offsets to produce a first set of addends, said first set of addends including said common addend;
applying said sequence of values to said second known sequence of values at said plurality of offsets to produce a second set of addends, said second set of addends including said common addend;
calculating a first correlate based, at least in part, on said first set of addends;
calculating a second correlate based, at least in part, on said second set of addends; and
wherein said first set of addends and said second set of addends are determined, at least partially, by a common subexpression elimination analysis.

16. The method of claim 15, wherein said step of producing a common addend responsive to said sequence of values further comprises the step of adjusting said common addend responsive to an offset value of said plurality of offsets.

17. The method of claim 16, wherein said step of adjusting said common addend responsive to an offset value of said plurality of offsets further comprises the step of adjusting said common addend by performing only two add or subtract operations when incrementing from a first offset of said plurality of offsets to a second offset of said plurality of offsets.

18. The method of claim 15, wherein said common addend is independent of both said first known sequence of values and said second known sequence of values.

19. The method of claim 15, wherein said step of calculating a first correlate based, at least in part, on said first set of addends comprises the step of calculating a negative of said first correlate if a number of non-zero first-order terms involved in said step of calculating a first correlate based, at least in part, on said first set of addends meets a predetermined criterion.

20. The method of claim 15, further comprising the steps of:

creating a plurality of second order terms by combining a respective plurality of at least two values of said sequence of values;

adjusting less than all second order terms of said plurality of second order terms when incrementing from a first offset of said plurality of offsets to a second offset of said plurality of offsets; and wherein said step of calculating a first correlate based, at least in part, on said first set of addends comprises the step of calculating said first correlate based, at least in part, on said plurality of second order terms.

21. A method for correlating a received sequence to a known sequence in a communications system, comprising the steps of:

receiving a sequence of values;

applying said sequence of values to at least one known sequence of values in a correlation equation, said correlation equation definable as including a sum of products of said sequence of values and said at least one known sequence of values; and determining a correlation result of a manipulated version of said correlation equation, said manipulated version of said correlation equation derived from performing at least two of the following modifications:

said correlation equation modified so that at least one product of said sum of products of said correlation equation becomes zero;

said correlation equation modified to produce a sum that is independent of said at least one known sequence of values;

said correlation equation, wherein said at least one known sequence of values includes a known number of values and at least two identical subsequences of values, modified such that a number of product addends of said sum of products of said correlation equation is less than said known number of said known number of values of said at least one known sequence of values by eliminating products corresponding to one of said at least two identical subsequences of values of said at least one known sequence of values;

said correlation equation and terms thereof modified so as to eliminate common subexpressions; and said correlation equation modified such that a negative result of said correlation equation is to be calculated.

22. The method of claim 21, further comprising the steps of:

determining whether said correlation result meets a predetermined criterion; and if so, initiating at least one algorithm for detecting and rejecting a signal that corresponds to said correlation result that meets said predetermined criterion.

23. The method of claim 21, wherein said communications system comprises a wireless communication system operating substantially in accordance with the Global System for Mobile Communications (GSM) standard.

24. The method of claim 21, wherein:

said step of applying said sequence of values to at least one known sequence of values in a correlation equation comprises the step of applying said sequence of values at a plurality of offsets to said at least one known sequence of values in said correlation equation.

25. A communication station for correlating a received sequence to a known sequence in a communications system, the communication station comprising:

a receiver, said receiver adapted to receive a sequence of values;

a processing unit operatively connected to said receiver, said processing unit adapted to apply said sequence of values to at least one known sequence of values in a correlation equation, said correlation equation definable as including a sum of products of said sequence of values and said at least one known sequence of values;

said processing unit operable to determine a correlation result of a manipulated version of said correlation equation, said manipulated version of said correlation equation derived as a result of performing at least two of the following modifications:

modify said correlation equation so that at least one product of said sum of products of said correlation equation becomes zero;

modify said correlation equation to produce a sum that is independent of said at least one known sequence of values;

modify said correlation equation, wherein said at least one known sequence of values includes a known number of values and at least two identical subsequences of values, such that a number of product addends of said sum of products is less than said known number of said known number of values by eliminating products corresponding to one of said at least two identical subsequences of values;

modify said correlation equation and terms thereof so as to eliminate common subexpressions; and modify said correlation equation such that a negative result of said correlation equation is to be calculated.

26. The communication station of claim 25, wherein said processing unit is further operable to determine whether said correlation result meets a predetermined criterion; and wherein the communication station further comprises means for initiating at least one algorithm for detecting and rejecting a signal that corresponds to said correlation result that meets said predetermined criterion.

27. The communication station of claim 25, wherein said communication system comprises a wireless communications system operating substantially in accordance with the Global System for Mobile Communications (GSM) standard.

28. The communication station of claim 25, further comprising a memory unit operatively connected to said processing unit, said memory unit storing a plurality of known sequences of values.

29. The communication station of claim 25, wherein the communication station comprises a mobile terminal or a base station.

30. A communication station for correlating a received sequence to a known sequence in a communications system, the communication station comprising:

a receiver, said receiver adapted to receive a sequence of values;

a memory, said memory storing a plurality of known sequences of values;

a processing unit operatively connected to said receiver and said memory, said processing unit programmed to compute a plurality of correlation results between said sequence of values and said plurality of known sequences of values; and wherein said processing unit is configured to compute said plurality of correlation results using a modified correlation equation; and wherein said modified correlation equation comprises a correlation equation that has been modified, said correlation equation definable as including a sum of products of said sequence of values and a known sequence of values from said plurality of known sequences of values, the modification resulting from performing at least two of the following operations;

modify said correlation equation so that at least one product of said sum of products of said correlation equation becomes zero;

modify said correlation equation to produce a sum that is independent of said known sequence of values;

modify said correlation equation, wherein said known sequence of values includes a known number of values and at least two identical subsequences of values, such that a number of product addends of said sum products is less than said known number of said known number of values by eliminating products corresponding to one of said at least two identical subsequences of values;

modify said correlation equation and terms thereof so as to eliminate common subexpressions; and modify said correlation equation such that a negative result of said correlation equation is to be calculated.

31. The communication station of claim 30, wherein said operations are completed prior to receiving said sequence of values and during a design or initialization phase of the communication station.

32. The communication station of claim 30, wherein said processing unit is further programmed to initiate at least one algorithm for detecting and rejecting any signal corresponding to a correlation result of said plurality of correlation results that is greater than a predetermined threshold.

33. The communication station of claim 30, wherein the communication station comprises at least one of a base station and a mobile terminal.

* * * * *

UNITED STATES PATENT AND TRADEMARK OFFICE
CERTIFICATE OF CORRECTION

PATENT NO. : 6,954,489 B2  Page 1 of 1
APPLICATION NO. : 09/753913
DATED : October 11, 2005
INVENTOR(S) : Lars Svensson et al.

It is certified that error appears in the above-identified patent and that said Letters Patent is hereby corrected as shown below:

In Column 11, Line 10, delete "$t_2=b_3+b_6+b+b_9$" and insert -- $t_2=b_3+b_6+b_8$ --, therefor.

In Column 11, Line 27, delete "$r_4=a_{14}+b_9+t_6$" and insert -- $r_4=a_{t4}+b_8+t_6$ --, therefor.

In Column 11, Line 32, delete "$r_7=t_4+t_6$" and insert -- $r_7=t_4+t_8$ --, therefor.

In Column 12, Line 11, after "absolute" insert -- value --, therefor.

In Column 12, Line 38, delete "$t_2=a_{11}30\ a_{12}+b_9+t_1$" and insert -- $t_2=a_{11}+a_{12}+b_9+t_1$ --, therefor.

In Column 12, Line 61, delete "$-r_7a_{16}+t_3+t_7$" and insert -- $r_7=a_{16}+t_3+t_7$ --, therefor.

In Column 15, Line 2, in Claim 1, after "have" delete "r".

In Column 15, Line 15, in Claim 5, delete "Communications" and insert -- communications --, therefor.

Signed and Sealed this

Thirtieth Day of June, 2009

JOHN DOLL
*Acting Director of the United States Patent and Trademark Office*